Patented Oct. 22, 1940

2,218,933

UNITED STATES PATENT OFFICE 2,218,933

COMPOSITION FOR PREVENTING EFFLORESCENCE ON CLAY BRICK

John G. Conte, Eastchester, N. Y.

No Drawing. Application September 9, 1939, Serial No. 294,093

1 Claim. (Cl. 134—78.5)

This invention relates to improvements in preventing efflorescence on brick walls of buildings exuding therefrom due to the action of water on the clay brick.

An object of my invention is to provide a novel and improved process for preventing the unsightly patches of efflorescence on brick walls commonly called "brick saltpeter."

Another object of my invention is to provide a new and improved composition for brick walls which shall prevent the exuding of efflorescence therefrom.

This and other objects of my invention will appear as the specification proceeds.

It is a common occurrence to see large and unsightly blotches of a white crystalline formation on the face of brick walls which appears to ooze out of the brick and which gives the building an ugly aspect. The crystalline blotches commonly known as "brick saltpeter" are caused by the sulfates and carbonates being drawn from the brick by the moisture, leaving a crystalline deposit on the surface of the brick, after the evaporation of the moisture. Many things have been suggested and tried to prevent these blotches of "brick saltpeter," but without avail. While washing with diluted acids and other strong active agents appears to remove them, the fact is that they soon reappear.

With the use of my invention I have succeeded in preventing efflorescence definitely and permanently.

I use a mixture of light mineral lubricating oil diluted with kerosene or common crankcase oil and add to it about five (5%) percent by volume of acetic acid. The proportion of the lubricating oil and kerosene depends on the temperature of the weather and the method of application to the wall, whether by brush or spraying machine. This solution is applied to a brick wall by brush or spray gun after the said wall has been washed with diluted hydrochloric acid which cleans and removes from the wall the efflorescence and other foreign matter already on the brick.

While the proportions of the ingredients have shown to give satisfactory results, it will be understood that I do not limit myself to the exact proportions, and I may make such changes as may properly come within the scope of the appended claim without departure from the spirit of my invention and the principles involved.

Having thus described my invention, what I claim as new and desire to secure by Letters Patent, is:

A composition for preventing efflorescence containing lubricating mineral oil, a mineral oil for thinning the said lubricating mineral oil consisting of kerosene and crankcase oil, and 5% of acetic acid.

JOHN G. CONTE.